(12) United States Patent
Martin et al.

(10) Patent No.: US 11,780,090 B2
(45) Date of Patent: Oct. 10, 2023

(54) APPARATUS, SYSTEM, AND METHOD OF CERTIFYING SENSING FOR AUTONOMOUS ROBOT NAVIGATION

(71) Applicant: JABIL INC., St. Petersburg, FL (US)

(72) Inventors: Charles Martin, St. Petersburg, FL (US); Christopher Jones, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 433 days.

(21) Appl. No.: 17/043,607

(22) PCT Filed: Mar. 29, 2019

(86) PCT No.: PCT/US2019/024845
§ 371 (c)(1),
(2) Date: Sep. 29, 2020

(87) PCT Pub. No.: WO2019/191592
PCT Pub. Date: Oct. 3, 2019

(65) Prior Publication Data
US 2021/0016444 A1 Jan. 21, 2021

Related U.S. Application Data

(60) Provisional application No. 62/649,925, filed on Mar. 29, 2018.

(51) Int. Cl.
*B25J 9/16* (2006.01)
*B25J 19/02* (2006.01)

(52) U.S. Cl.
CPC .......... *B25J 9/1676* (2013.01); *B25J 9/1653* (2013.01); *B25J 19/023* (2013.01)

(58) Field of Classification Search
CPC ...... B25J 9/1676; B25J 9/1653; B25J 19/023; G01S 7/497; G01S 17/894; H04N 23/56; H04N 17/002; G05D 1/0246
See application file for complete search history.

(56) References Cited

U.S. PATENT DOCUMENTS 11,563,929 B2 * 1/2023 Saphier .................. G01B 11/25
2012/0185094 A1 * 7/2012 Rosenstein .......... G05D 1/0272
901/1

(Continued)

*Primary Examiner* — Robert T Nguyen
(74) *Attorney, Agent, or Firm* — Riverside Law LLP (57) ABSTRACT

An apparatus, system and method of for certifying a sensor that at least partially navigates an autonomous mobile robot. The apparatus may include at least a robot body; at least one light source resident on the robot body proximate to the sensing camera such that the at least one light source is capable of at least partially irradiating a field of view (FoV) of the sensing camera, wherein the at least one light source has characteristics substantially mated to the sensing camera; and at least one processing system that provides the at least partial navigation. The at least one processing system may execute the steps of: actuating the at least one light source at a predetermined time and for a predetermined duration; monitoring data from the sensing camera for confirmation of the actuating; calculating at least one of the latency, throughput, and reactivity of the sensing camera based on the monitoring; and at least partially navigating based on the calculating.

20 Claims, 11 Drawing Sheets

(56) References Cited

U.S. PATENT DOCUMENTS

| | | | |
|---|---|---|---|
| 2014/0085459 A1* | 3/2014 | Blanton | H04N 17/04 348/135 |
| 2015/0253777 A1* | 9/2015 | Binney | G05D 1/0246 701/28 |
| 2017/0078646 A1* | 3/2017 | Matsunobu | H04N 23/90 |
| 2017/0285651 A1* | 10/2017 | Ji | G05D 1/0246 |
| 2017/0300061 A1* | 10/2017 | Hickerson | G05D 1/0246 |
| 2019/0182136 A1* | 6/2019 | Tamm | H04L 43/0852 |
| 2019/0243376 A1* | 8/2019 | Davis | G06T 7/292 |
| 2019/0259260 A1* | 8/2019 | Amini | H04W 36/0011 |
| 2019/0260488 A1* | 8/2019 | Emmanuel | H04W 52/0261 |
| 2019/0260923 A1* | 8/2019 | Emmanuel | G08B 27/006 |
| 2019/0261007 A1* | 8/2019 | Emmanuel | H04N 23/6811 |
| 2019/0261243 A1* | 8/2019 | Amini | G08B 13/19695 |
| 2020/0077078 A1* | 3/2020 | Denenberg | H04N 25/60 |
| 2023/0024518 A1* | 1/2023 | Clymer | G06F 3/04847 |
| 2023/0071953 A1* | 3/2023 | Dhayalkar | B25J 9/1692 |
| 2023/0083293 A1* | 3/2023 | Xu | G01S 7/4873 |

* cited by examiner

APPARATUS, SYSTEM, AND METHOD OF CERTIFYING SENSING FOR AUTONOMOUS ROBOT NAVIGATION

CROSS-REFERENCE TO RELATED APPLICATION

This application is a national stage application of International Patent Application No. PCT/US2019/024845, filed Mar. 29, 2019, entitled: APPARATUS, SYSTEM, AND METHOD OF CERTIFYING SENSING FOR AUTONOMOUS ROBOT NAVIGATION, which claims the benefit of priority to U.S. Provisional Application No. 62/649,925, filed Mar. 29, 2018, entitled APPARATUS, SYSTEM, AND METHOD OF CERTIFYING SENSING FOR AUTONOMOUS ROBOT NAVIGATION, the entirety of which is incorporated herein by reference as if set forth in its entirety.

BACKGROUND

Field of the Disclosure

The disclosure relates generally to robotics, and, more particularly, to an apparatus, system, and method of certifying sensing for autonomous robot navigation.

Background of the Disclosure

The use of small cameras has become ubiquitous in modern society. With ever-increasing technological advancement, camera technologies and image processing have improved drastically since the advent of so-called "Webcams" in the early 2000s. Camera technologies are thus highly prevalent in many fields and are used for a great myriad of reasons, including Webcams for social use, automated cameras for security monitoring, and safety cameras, such as automotive backup cameras, by way of non-limiting example.

Of course, the type and capabilities of a camera may be selected based on any of a number of factors, such as required performance and cost, for example. Thus, the typical social media camera (i.e., a Webcam) is generally chosen to be inexpensive, and hence doesn't provide a high level of performance. Consequently, such cameras often "glitch"—that is, due to latency, lack of performance, interrupt prioritization, inadequate throughput, inadequate connectivity, minimalistic processing capability, over-buffering, and the like, the camera may hang up, misread, blur out, go black, experience static, or otherwise fail for fleeting or non-fleeting time periods. But, in the course of using such a camera, it is typical that no harm beyond user-annoyance occurs even in the event of the most significant of glitches. That is, even upon a severe glitch, the worst case scenario requires only that a user "hang up" the camera and "call back" the party on the other end of the camera connection.

This stands in stark contrast to other possible camera uses. For example, a glitch during the use of an automotive backup camera may have catastrophic consequences, such as occurrence of a significant injury or death. Indeed, the Department of Transportation and the National Highway Traffic Safety Administration estimate that the use of vehicular backup cameras has saved thousands of people from injury or death, without consideration of the considerable savings in property damage. But, due to the high level of performance needed for such cameras, and the need for such cameras to be safety certified for consistent and adequate performance, vehicular backup cameras generally cost $2,000 USD or more.

The recent proliferation of autonomous robots in a number of settings, including retail, inventory management, security and patrol, transportation assistance, and hazardous material handling, often employs one or more cameras, such as those discussed above, to monitor the navigation arena, ensure safe operation, plan paths traversed, avoid collisions and property damage, and so on. However, in many of the foregoing and other circumstances in which cameras are used for autonomous mobile robot guidance, a relatively rich picture of the operating environment must emerge from the camera data, in real time, to allow proper operation of the robot. As such, it has generally been the case that, in the foregoing and other similar contexts, safety-certified cameras and camera systems must be employed.

Unfortunately, as referenced above, the need to use certified safety camera systems adds significant expense to such a robot—which may make the use of an autonomous mobile robot infeasible in many situations. Moreover, the need for a certified safety camera increases the necessary speed and volume of data processing, as well as the physical volume allotted to the camera system and processing system, and each of these issues yet further increases the cost of the autonomous mobile robot, thereby limiting the contexts in which such a robot may be used.

SUMMARY OF THE DISCLOSURE

The disclosure is and includes at least an apparatus, system and method of for certifying a sensor that at least partially navigates an autonomous mobile robot. The apparatus may include at least a robot body; at least one light source resident on the robot body proximate to the sensing camera such that the at least one light source is capable of at least partially irradiating a field of view (FoV) of the sensing camera, wherein the at least one light source has characteristics substantially mated to the sensing camera; and at least one processing system that provides the at least partial navigation.

The at least one processing system may comprise a processor for executing non-transitory computing code stored in at least one computing memory, wherein execution of the computing code by the processor comprises the steps of: actuating the at least one light source at a predetermined time and for a predetermined duration; monitoring data from the sensing camera for confirmation of the actuating; calculating at least one of the latency, throughput, and reactivity of the sensing camera based on the monitoring; and at least partially navigating based on the calculating.

BRIEF DESCRIPTION OF THE DRAWINGS

The disclosure is illustrated by way of example and not limitation in the accompanying drawings, in which like references indicate similar elements, and in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, systems and methods of use are disclosed herein that may provide access to and transformation of a plurality of types of digital content, including but not limited to video, image, text, audio, metadata, algorithms, interactive and document content, and which track, deliver, manipulate, transform and report the accessed content. Described embodiments of these modules, systems and methods are intended to be exemplary and not limiting. As such, it is contemplated that the herein described systems and methods may be adapted and may be extended to provide enhancements and/or additions to the exemplary modules, systems and methods described. The disclosure is thus intended to include all such extensions.

Furthermore, it will be understood that the terms "engine", "application", or "module", as used herein, do not limit the functionality to particular physical modules, but may include any number of tangibly-embodied software and/or hardware components having a transformative effect on at least a portion of a system. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (which may work in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

As discussed above, a significant gap exists between the performance of a certified safety camera and a far-less-expensive depth camera. This performance gap includes the likelihood of "glitches" in the operation and data stream of the uncertified depth camera, such as glitches that may be caused by latency, lack of performance, interrupt prioritization, inadequate throughput, inadequate connectivity, minimalistic processing capability, over-buffering, and the like.

Regardless of the cause of the glitches in the uncertified depth camera, the use of such cameras in certain applications requiring a high level of safety, which necessitates a dependable and real time data stream, such as the navigation of autonomous mobile robotics, requires that the performance gap between the certified and uncertified cameras be closed. Needless to say, the most simplistic design choice to eliminate this gap is to substitute a certified camera into a design, rather than an uncertified camera; however, such a substitution may increase the cost of the overall device into which the camera is placed by thousands of dollars. Further, the use of a certified camera in certain contexts, such as mobile robots, may cause a cascade of increased costs in the device, such as due to the increased data stream and the consequent need for heightened processing capabilities, due to the increased need for physical space onboard the device, and so on.

However, in order to use non-certified complex sensors in safety critical systems, it would be necessary to perform diagnostics which measure aspects of the system and insure operation in a manner akin to a certified system in order to certify the non-certified sensor system. Thus, to make use of such non-certified sensors in a safety critical system, it is necessary to provide sufficient diagnostic capability so as to demonstrate adequate risk reduction.

For example, a critical aspect of using a non-certified camera to navigate an autonomous mobile robot, and specifically to perform obstacle avoidance, cliff detection, and like functions is how recently the sensor data used for navigation was acquired. Since the sensor camera is not certified, quantifying the bound on this latency may prove difficult. Nevertheless, this gap in quantifying the suitability of the camera(s) to provide for such autonomous navigation as compared to an embodiment using a safety certified camera must be close in order to enable the use of non-certified cameras in such a use-context.

The embodiments close the aforementioned gap to enable the use of an uncertified camera system, such as with an autonomous mobile robot. The gap is closed by providing a non-certified camera and processing system that behaves in a manner akin to a certified camera system. The uncertified camera system may be, by way of example, a simple depth sensing camera.

More particularly, the disclosure provides mechanisms to directly alter the depth image by shining and/or reflecting a simple light source, such as a LED, into the depth camera's field of view. This alteration of the depth camera image data may be initiated in accordance with a safety certified protocol, and results may be assessed by the same processing platform that initiates the protocol, even though the data path for the image data flows through one or more non-certified processing platforms.

That is, the embodiments may provide a real-time safety protocol calibration, such as may be performed at predetermined intervals, in order to assess camera function and insure operation at or near that of a certified camera. More particularly, a latency measurement for the image data of the blinding of a disclosed non-certified camera may be compared to the acceptable clocking in a safety certified system.

The calibration system may include an automated or manual actuator which actuates an alteration to the depth image of the camera that is detectable to the processing system associated with the camera. The processing system may then insure that the camera is operating acceptably to meet applicable safety needs, i.e., the camera does not suffer from excessive latency, has adequate throughput, provides undegraded data, etc.

Figure 1:
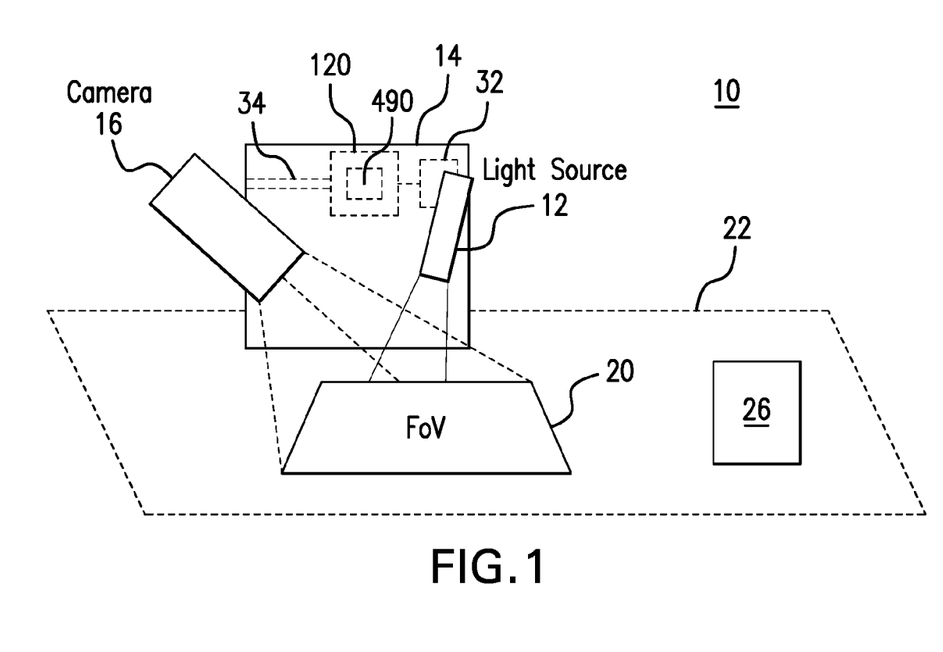
FIG. 1 illustrates an exemplary certification system.

FIG. 1 illustrates a system 10 according to some embodiments. As illustrated, a light source 12, such as an infrared (IR) LED or white or colored LED source, is provided physically on a device 14, such as on an autonomous mobile robot. By way of non-limiting example, a suitable IR LED may be the VSMG10850, offered by Vishay. This IR LED operates at 850 nm, and is a GaAlAs side emitting diode.

The light source 12 may be situated so as to be able to irradiate the field of view (FoV) 20 of a substantially adjacent camera 16, such as a depth camera, having characteristics substantially mated to the light source 12, which may also reside physically on the device 14, such as on a mobile robot. Needless to say, the irradiation source 12 may, in some embodiments, be subjected to a preliminary alignment process.

The FoV 20 of the depth camera 16 may be, in typical instances, an area on a floor 22 over which the robot 14 travels. For example, this FoV 20 may be provided in order that the mobile robot 14 can avoid obstacles 26, including living and otherwise dynamic obstacles, during autonomous navigation. This autonomous navigation and obstacle avoidance is controlled by one or more processing systems 120, which may, in some embodiments, also be onboard the device 14 that also carries the light source 12 and the at least one depth camera 16. It should be noted that the FoV 20 may also include, in some embodiments, the body of the robot 14 itself.

This processing system 20 may also control the actuator 32 that actuates the irradiation source 12, and may monitor the data stream 34 of the depth camera 16 for responsiveness to actuation of the source 12. By way of non-limiting example, the processing system 120 may have, stored as non-transitory code in a computing memory associated therewith, one or more calibration algorithms/applications 490, such as may depend on depth camera type, irradiation type, the use context associated with a robot 14 with which the depth camera 16 is associated, and/or the use environment of the robot 14 associated with the depth camera 16, by way of non-limiting example.

The stored calibration algorithms 490 may include a frequency, power, and/or a manual override pursuant to which the actuator 32 is actuated in order to drive the light source 12. Once the source 12 irradiates at least a portion of the FoV 20 of the depth camera 16, the depth camera data 34 generated may be monitored by the processing system 120 to confirm propriety of operation in accordance with any applicable criteria indicated in the algorithm(s) 490. For example, minimal latency in obstacle analysis may be necessary in any embodiment in which a mobile robot 14 is operating where people are present, and thus, for such a robot 12 in such an environment, the processing system 120 may actuate the irradiation 12, then read the time-stamped pixels of the FoV of the depth camera (34) viewing the irradiated area. If the depth camera 16 illustrates that the proper pixel data 34 evidences the irradiating energy is viewed with equal to or less than an acceptable lag according to the algorithm 490, the processing system 120 may allow continued operation of the robot associated with the camera, such as by indicating as such to one or more governing software programs also communicative with and/or executed by the processing system 120. On the contrary, if the proper pixels do not suitably "see" the irradiating energy, and/or if the pixels evidence the presence of the irradiating energy only after an unacceptably long delay, that processing system 120 may dictate the stoppage of further operation of the robot 14, and/or may cause to be sent an alert for maintenance, by way of example.

Thus, the measurement of time from actuation of the light source 12 to the detectable alteration in the depth camera's imaging data 34 may be one of several different key parameters assessed by the algorithm(s) 490 in the embodiments. Other parameters may include, for example, the level of detectable alteration in an image, or in pixels thereof; the comparative alteration of some pixels versus others; the ability of the camera to sense the irradiation in one camera FoV as compared to another; and so on.

The measurement of time from actuation of the irradiation source 12 to the detectable alteration in the depth camera's imaging data 34 provides a bound on the absolute value of the real latency in the camera's sensing capabilities. The real latency is a critical safety parameter in a certified system, and thus is a key parameter in a mobile robot embodiment. This is, in part, because the depth sensor 16 may be used for obstacle avoidance, slope detection, and/or hole or cliff detection, and the bounded real latency must be taken into account to determine the worst case reaction time by the robot 14 being navigated, in part, by the camera 16, to any of the foregoing issues. Further, as the depth sensor 16 is presumptively not safety certified, it is necessary to demonstrate via the foregoing methodology that the latency bound is correct and that the system 10 can comply with the same latency requirements as a certified camera. Of note, after measuring the latency, the disclosed embodiments may maintain the latency bound by repeatedly monitoring the time between proper depth images received by the disclosed safety calibration processing system 120.

Although the illustration of FIG. 1 is provided with respect to an IR or LED light source 12, the actuated source, and additionally the depth sensor 16, may differ from those explicitly referenced in the foregoing discussion of FIG. 1; although it is preferable that the sensor 16 and actuated source 12 be paired such that the sensor may be suitably calibrated and tested. For example, in the case of a structured light camera 16, a bright light source 12 may be shone on the floor 22, or on a surface of the robot 14, within the sensor's FoV 20. In such an exemplary embodiment, the "blinding" of the structured light sensor 16 results in a "dropout" of the depth image data 34 from the sensor 16.

In an additional example, a light source 12 may be placed highly proximate to the lens of a camera 16, such as structured light camera, along with a reflector to reflect enough light from the light source 12 to "blind" a shape, such as a donut shape, of the depth image data 34. Such a solution may also be applied to a stereo depth camera system, such as by applying the donut to one of the two stereo cameras. In such a calibration, because no correspondence occurs for the donut in the second camera, a large dropout appears in the produced image, thus indicating the light source has been stereo-sensed.

Figure 2:
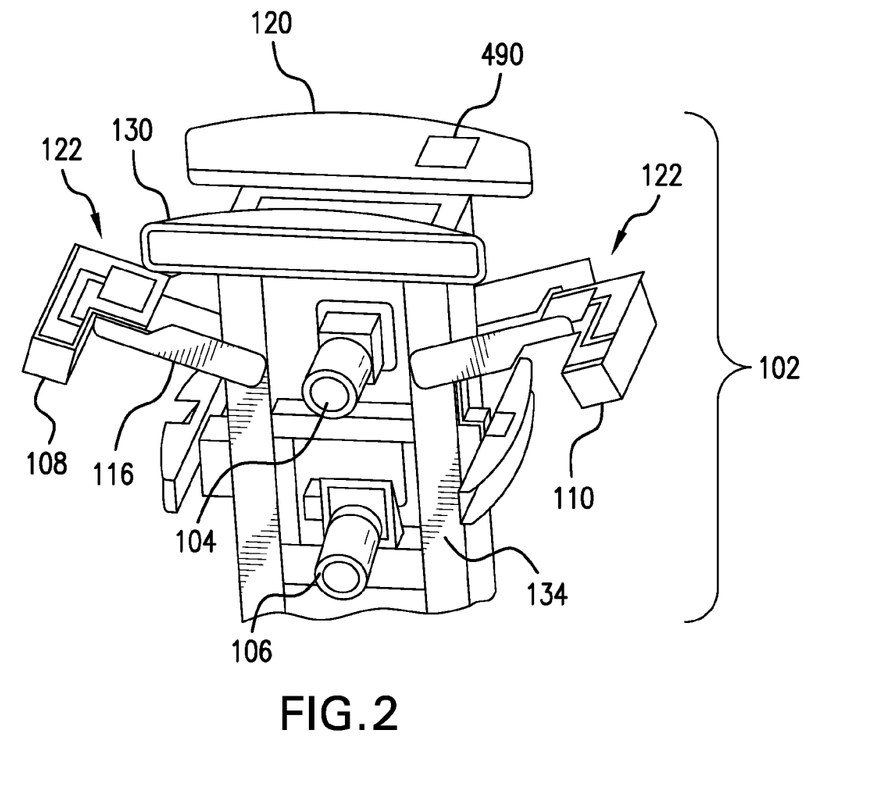
FIG. 2 illustrates an exemplary certification system.

FIG. 2 illustrates an embodiment of a robot upper portion 102 having two depth sensing cameras 104, 106, and having two irradiating sources 108, 110. In the embodiment shown, the irradiating sources 108, 110 may be side-emitting LED sources, by way of non-limiting example.

In the illustration, the irradiating source(s) 108, 110 may be suspended from side arms 116 and/or flexible cable circuits 122, and may be communicatively connective to the processing system 120 and the actuator 130 at least partially via the flexible printed cable circuits 122, although other configurations may be provided without departing from the disclosure. The flexible printed cable circuit(s) 122 may be mounted to and/or within the camera housing 134, as shown, although other configurations may be evident to those skilled in the art in light of the discussion herein. Use of the flexible cable circuit(s) 122 may remedy the need for any additional alignment of the irradiation source 108, 110, and the adjacency to the sensing camera 104, 106 limits the required level of irradiation from the light source 108, 110 in order to perform the algorithms 490.

Figure 3:
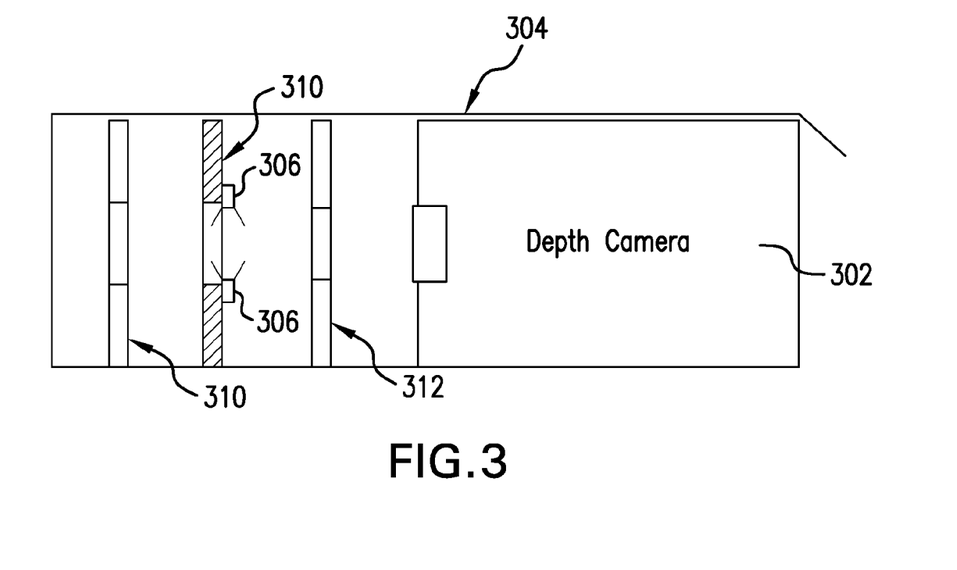
FIG. 3 illustrates an exemplary camera blinding system.

FIG. 3 illustrates an embodiment of a depth camera 302 mounted within a camera housing 304. In the illustration, a side mounted LED irradiation source 306 is provided, at least in part using a flex circuit 310, adjacent to or on the camera housing 304.

Also shown in the embodiment of FIG. 3 is the provision of reflective surfaces 310, 312 in order to insure that the light source 306 affects the FoV of the adjacent depth camera 302. In the illustration, two reflective surfaces 310, 312, such as a white surface and a silver surface, are provided to reflectively focus the radiated energy to the camera FoV, although it will be understood that other numbers, types, placements and/or colors of reflective surfaces may be employed according to the embodiments.

Figure 4:
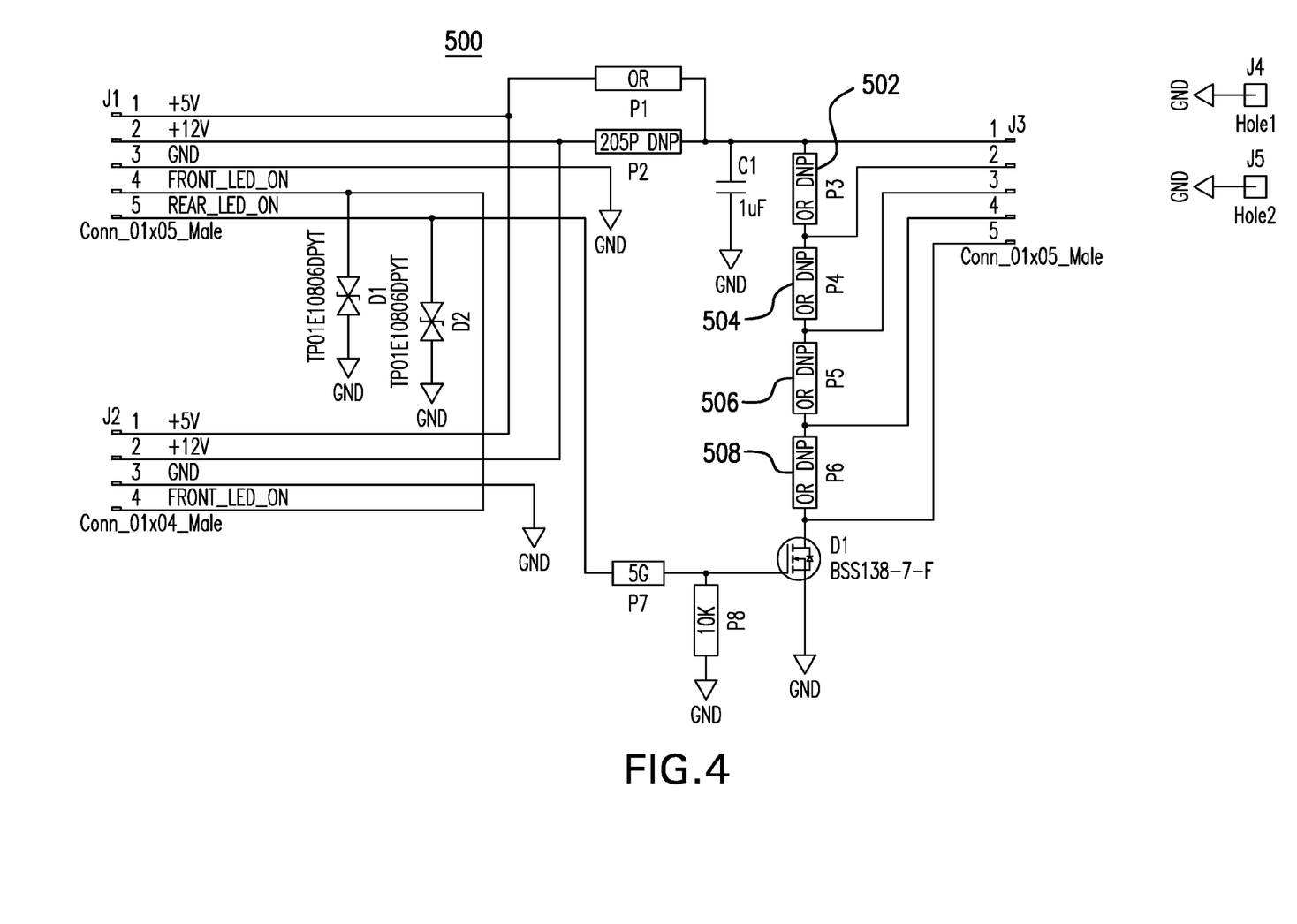
FIG. 4 illustrates an exemplary circuit schematic.

FIG. 4 is a circuit schematic illustrating an exemplary control circuit 500 for an LED irradiating source for use in the embodiment of FIGS. 1-3. In the example, the LEDs used to irradiate the FoV is selectable by selection from the population of resistors 502-508 in the control circuit 500.

Figure 5A:
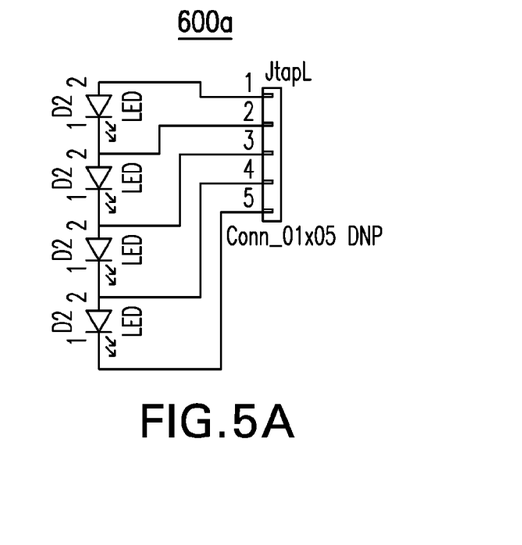
FIGS. 5A and 5B illustrate a schematic and print layout for an exemplary circuit.
Figure 5B:
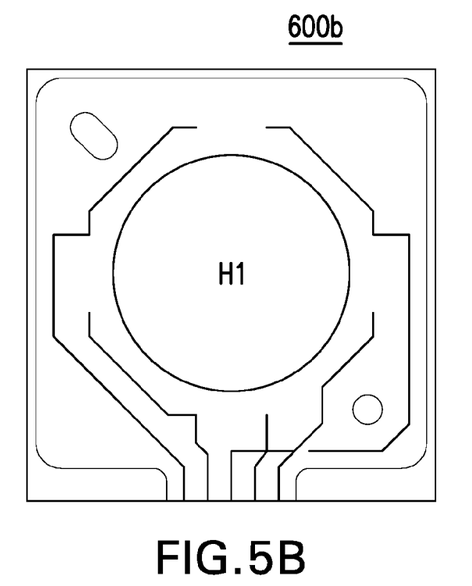
Figure 6:
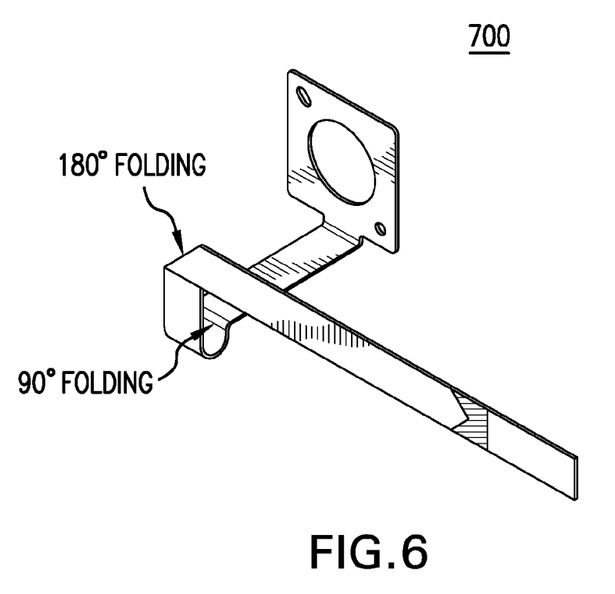
FIG. 6 illustrates an exemplary flexible light source connector.

FIGS. 5A and 5B illustrate aspects of the flexible printed cable circuit 600 discussed herein. More particularly, FIG. 5A illustrates a circuit schematic 600a for an exemplary flexible cabling circuit. FIG. 5B illustrates an exemplary print layout 600b for a printing of the flexible cable circuit 600a of FIG. 5A. FIG. 6 illustrates an exemplary flexible cable 700 suitable for use with an IR source, such as is discussed above with respect to FIGS. 2-4.

Figure 7:
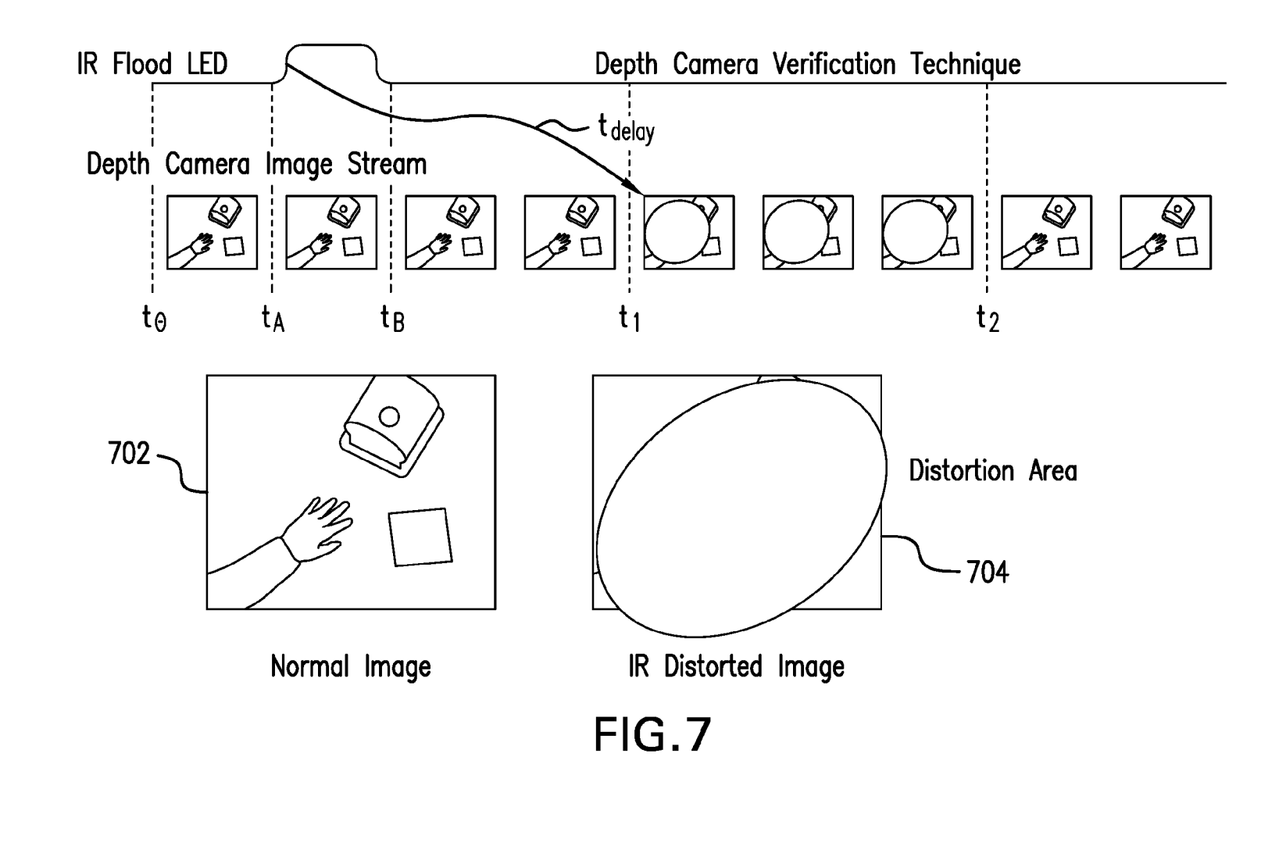
FIG. 7 illustrates an exemplary timing and data diagram.

FIG. 7 provides a timing and data diagram illustrative of some embodiments. Shown at the lower portion of the figure is the normal image data 702 for the camera's FoV, and how the proper data obtained for the FoV should appear to the camera when the blinding LED is actuated 704.

In the illustration, the "blinding" LED is actuated at time tA, and is deactivated at time tB. As will be noted, the normal image data comprises the data stream from the camera from time t0 until time t1; the blinded image data comprises the data stream from time t1 to t2; and the normal image data again comprises the data stream from time t2 on. Accordingly, the time from tA to t1 is the latency of the camera and its processing system, and it is this latency which may be compared to a predetermined threshold of acceptability.

Moreover, if the camera and its processing system are operating properly, the time t1 to t2 should be at least substantially equal to the time tA to tB. If these time windows are substantially unequal, such as beyond a predetermined threshold, it may be an indication of inadequate throughput, reactivity, or latency of the camera and its processing system.

Figure 8:
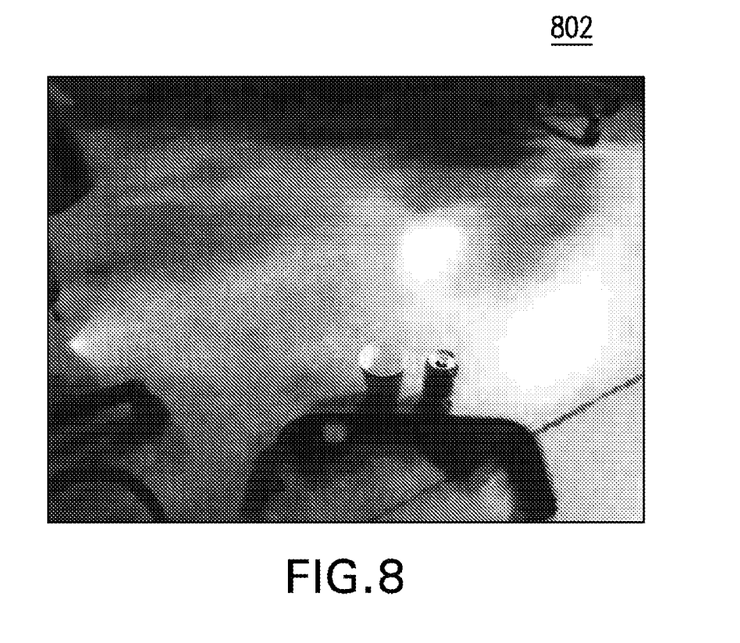
FIG. 8 illustrates exemplary image data.
Figure 9:
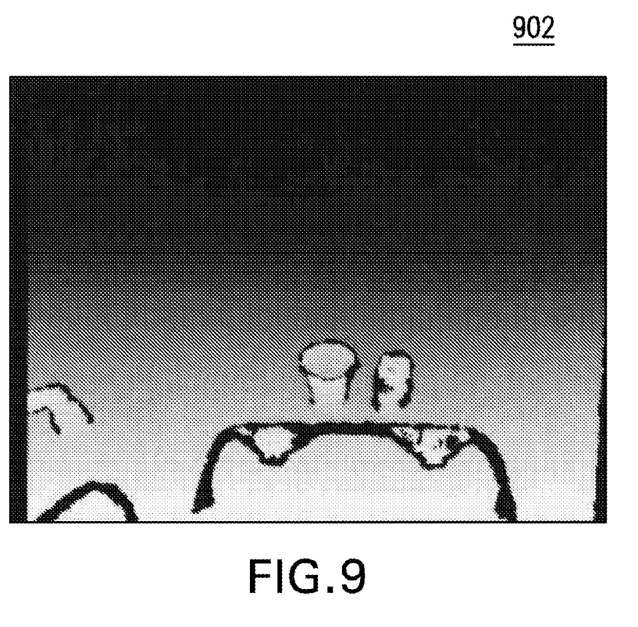
FIG. 9 illustrates exemplary image data.
Figure 10:
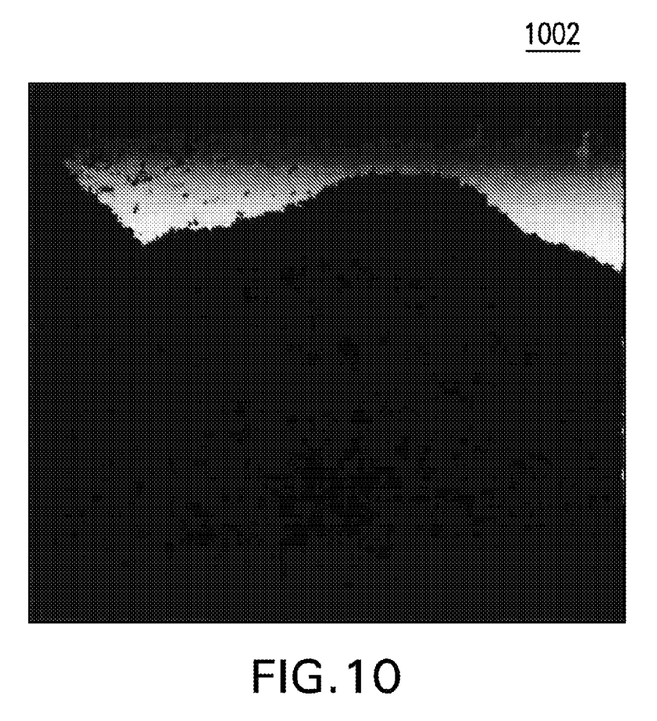
FIG. 10 illustrates exemplary image data.

FIGS. 8-10 provide an illustration of the data produced by a camera before and during calibration in the disclosed embodiments. More specifically, FIG. 8 illustrates a so-called "RGB" (Red-Green-Blue) camera output data 802 for a FoV from the upper portion of a mobile robot. FIG. 9 illustrates the same FoV, but instead shows the output data 902 from a depth sensing camera. FIG. 10 illustrates the same FoV of the depth camera of FIG. 9, but in FIG. 10, the data 1002 indicates that the FoV has been irradiated with a "blinding" IR LED.

As is evident from FIGS. 9 and 10, the exemplary depth camera has, indeed, sensed the blinding irradiation provided from the IR LED. However, and as discussed above, an additional aspect of the calibration inquiry necessitates an assessment of whether the sensing of the blinding irradiation occurred in a suitable timeframe, given the capabilities of the robot to which the depth camera of FIGS. 9 and 10 is affixed. If the sensing of the IR LED source in the FoV occurred in an acceptable timeframe given a predetermined threshold to which the time-to-sense is compared by the processing system, then normal operation of the robot may continue. However, if the threshold timeframe was exceeded before the sensing was evident, operation of the robot may be ceased by the processing system, and an alert sent, by way of non-limiting example.

Figure 11:
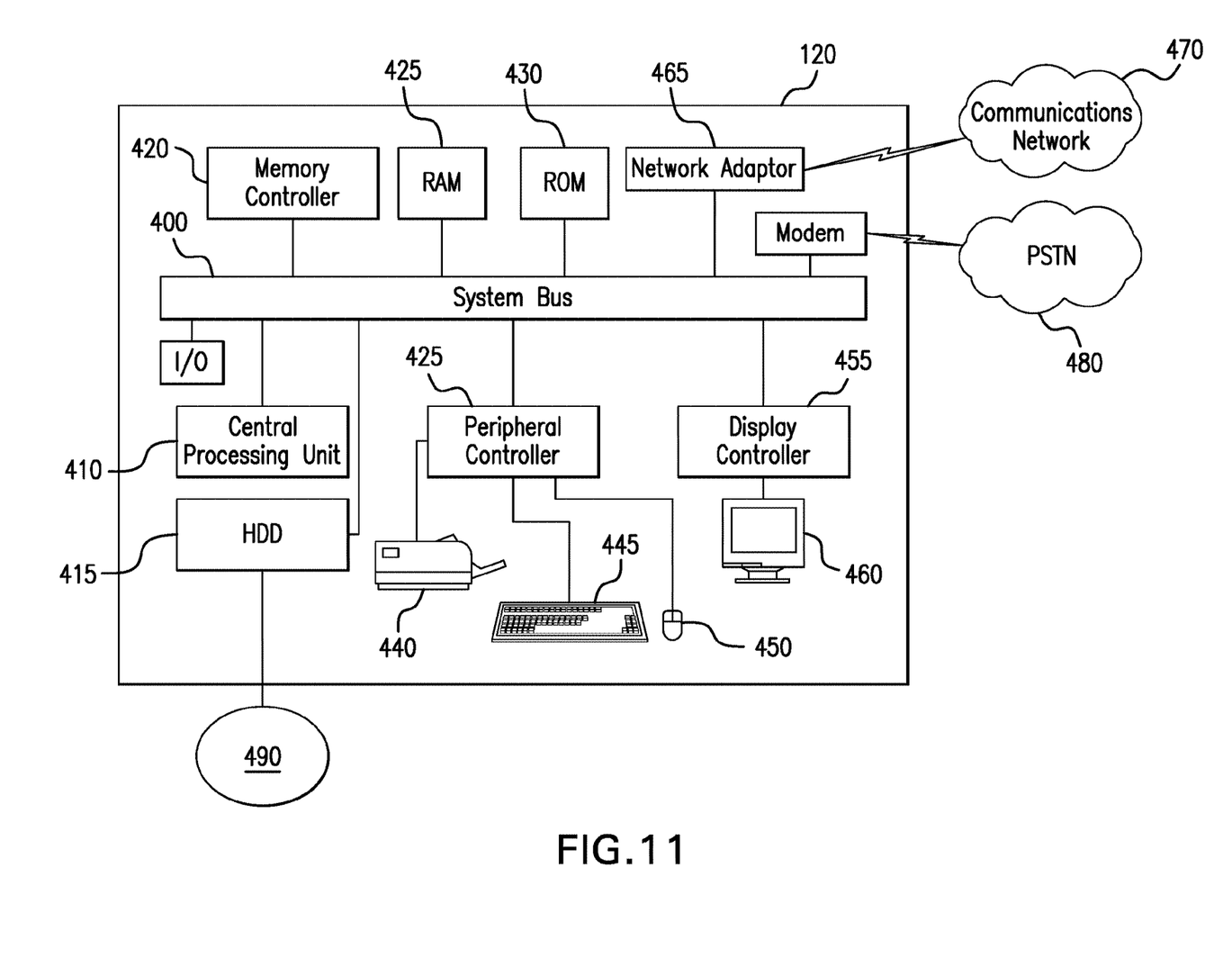
FIG. 11 is a schematic diagram illustrating an exemplary processing system.

FIG. 11 depicts an exemplary computer processing system 120 for use in association with the embodiments, by way of non-limiting example. Processing system 120 is capable of executing software, such as an operating system (OS) and one or more computing algorithms/applications 490 such as those discussed throughout. The operation of exemplary processing system 120 is controlled primarily by the computer readable instructions/code discussed throughout, such as instructions stored in a computer readable storage medium, such as hard disk drive (HDD) 415, optical disk (not shown) such as a CD or DVD, solid state drive (not shown) such as a USB "thumb drive," or the like. Such instructions may be executed within central processing unit (CPU) 410 to cause system 120 to perform the disclosed operations, comparisons and calculations. In many known computer servers, workstations, personal computers, and the like, CPU 410 is implemented in an integrated circuit called a processor.

It is appreciated that, although exemplary processing system 120 is shown to comprise a single CPU 410, such description is merely illustrative, as processing system 120 may comprise a plurality of CPUs 410. Additionally, system 120 may exploit the resources of remote CPUs (not shown) through communications network 470 or some other data communications means 480, as discussed above.

In operation, CPU 410 fetches, decodes, and executes instructions from a computer readable storage medium such as HDD 415. Such instructions may be included in software such as an operating system (OS), executable programs/applications 490, and the like. Information, such as computer instructions and other computer readable data, is transferred between components of system 120 via the system's main data-transfer path. The main data-transfer path may use a system bus architecture 405, although other computer architectures (not shown) can be used, such as architectures using serializers and deserializers and crossbar switches to communicate data between devices over serial communication paths. System bus 405 may include data lines for sending data, address lines for sending addresses, and control lines for sending interrupts and for operating the system bus. Some busses provide bus arbitration that regulates access to the bus by extension cards, controllers, and CPU 410.

Memory devices coupled to system bus 405 may include random access memory (RAM) 425 and/or read only memory (ROM) 430, by way of example. Such memories include circuitry that allows information to be stored and retrieved. ROMs 430 generally contain stored data that cannot be modified. Data stored in RAM 425 can be read or changed by CPU 410 or other hardware devices. Access to RAM 425 and/or ROM 430 may be controlled by memory controller 420. Memory controller 420 may provide an address translation function that translates virtual addresses into physical addresses as instructions are executed.

In addition, processing system 120 may contain peripheral communications controller and bus 435, which is responsible for communicating instructions from CPU 410 to, and/or receiving data from, peripherals, such as peripherals 440, 445, and 450, which may include printers, keyboards, and/or the elements discussed herein throughout. An example of a peripheral bus is the Peripheral Component Interconnect (PCI) bus that is well known in the pertinent art.

Display 460, which is controlled by display controller 455, may be used to display visual output and/or presentation data generated by or at the request of processing system 120, responsive to operation of the aforementioned computing programs/applications 490. Such visual output may include text, graphics, animated graphics, and/or video, for example. Display 460 may be implemented with a CRT-based video display, an LCD or LED-based display, a gas plasma-based flat-panel display, a touch-panel display, or the like. Display controller 455 includes electronic components required to generate a video signal that is sent to display 460.

Further, processing system 120 may contain network adapter 465 which may be used to couple system 120 to external communication network 470, which may include or provide access to the Internet, an intranet, an extranet, or the like. Communications network 470 may provide access for processing system 120 with means of communicating and transferring software and information electronically. Additionally, communications network 470 may provide for distributed processing, which involves several computers and the sharing of workloads or cooperative efforts in performing a task, as discussed above. Network adaptor 465 may communicate to and from network 470 using any available wired or wireless technologies. Such technologies may include, by way of non-limiting example, cellular, Wi-Fi, Bluetooth, infrared, or the like.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. A certification system for a sensing camera that at least partially navigates an autonomous mobile robot, comprising:
    a robot body;
    at least one light source resident on the robot body proximate to the sensing camera such that the at least one light source is capable of at least partially irradiating a field of view (FoV) of the sensing camera, wherein the at least one light source has characteristics substantially mated to the sensing camera;
    at least one processing system that provides the at least partial navigation, wherein the at least one processing system comprises a processor for executing non-transitory computing code stored in at least one computing memory, and wherein execution of the computing code by the processor comprises the steps of:
        actuating the at least one light source at a predetermined time and for a predetermined duration;
        monitoring data from the sensing camera for confirmation of the actuating;
        calculating at least one of the latency, throughput, and reactivity of the sensing camera based on the monitoring;
        at least partially navigating based on the calculating.

2. The system of claim 1, wherein the calculating further comprises at least one of:
    comparing an alteration of some pixels versus others in the data; and
    comparing the data of the sensing camera to second data of a second sensor.

3. The system of claim 1, wherein at least the actuating, monitoring and calculating vary dependently upon at least one of a type of the sensing camera, a type of the light source type, a distance between the light source and the sensing camera, a use context of the robot, and a use environment of the robot.

4. The system of claim 1, wherein the actuating comprises a choice of a frequency, a power, or a manual override of the light source.

5. The system of claim 1, further comprising confirming proper operation of the sensing camera based on the monitoring.

6. The system of claim 5, wherein the proper operation comprises minimization of the latency.

7. The system of claim 1, wherein the monitoring comprises reading time-stamped pixels of the FoV of the sensing camera.

8. The system of claim 6, wherein, if the latency is minimized, the navigating comprises allowing continued operation of the robot.

9. The system of claim 6, wherein, if the latency is not sufficiently minimized, the navigating comprises a cessation of operation of the robot.

10. The system of claim 9, wherein the navigating further comprises sending a maintenance alert.

11. The system of claim 1, wherein the light source comprises one selected from the group consisting of an infrared (IR) LED, a white LED, and a colored LED.

12. The system of claim 11, wherein the light source is an IR LED operating at 850 nm, consists of GaAlAs, and is side emitting.

13. The system of claim 1, wherein the sensing camera comprises a depth camera.

14. The system of claim 13, wherein the depth camera comprises a 3D depth camera.

15. The system of claim 1, wherein the light source is preliminarily aligned.

16. The system of claim 1, wherein the FoV of the sensing camera comprises at least an area on a floor over which the robot travels, and the robot body.

17. The system of claim 1, wherein the navigating comprises avoiding obstacles revealed by the monitoring.

18. The system of claim 17, wherein the obstacles comprises dynamic obstacles.

19. The system of claim 1, wherein the sensing camera is a structured light camera.

20. The system of claim 1, wherein the light source further comprises a plurality of reflectors to direct light into the FoV.

* * * * *